United States Patent Office 3,098,876
Patented July 23, 1963

3,098,876
PRODUCTION OF HYDROCARBON DERIVATIVES
OF DECABORANE
Murray S. Cohen, Dover, and Carl E. Pearl, Morristown, N.J., assignors, by mesne assignments, to Thiokol Chemical Corporation, a corporation of Delaware
No Drawing. Filed July 1, 1955, Ser. No. 519,623
10 Claims. (Cl. 260—606.5)

This invention relates to the manufacture of liquid, hydrocarbon derivatives of decaborane. In one aspect, it relates to the manufacture of liquid alkyl decaboranes by the treatment of decaborane in a non-reactive solvent with a metal alkyl and an alkyl halide.

In the process of the present invention, decaborane, a metal alkyl and a hydrocarbon halide are contacted in a suitable solvent to obtain the hydrocarbon derivative of the decaborane. The order of addition of the reactants can be varied and the reaction can be carried out in one or more stages. Preferably a two-stage modification of the process of the present invention is used whereby the metal alkyl, suitably dissolved in a non-reactive solvent, is added to decaborane dissolved in a similar or different non-reactive solvent. Alternatively, the reverse order of addition can be used. In either case, from about 0.5 to 3 moles of metal alkyl are used per mole of decaborane. When mono-substituted decaboranes are desired, approximately one mole of metal alkyl per mole of decaborane is preferably used. The proportion of metal alkyl can be reduced to about 0.5 or less when the mono-substituted derivative is the preferred product but lower conversions must suffice. When the production of mixed poly-substituted decaboranes is preferred, larger proportions of the metal alkyl, up to about 3 moles or more per mole of decaborane, can be used.

During the reaction, some gas evolution occurs and the gas is largely the alkane derived from the metal alkyl (ethane where the metal alkyl is ethyl lithium), resulting in the production of some decaborane-metal reaction product. In starting the reaction it is advantageous to maintain an inert atmosphere over the reactants. For this purpose any non-reactive gas can be used including dry hydrocarbon gases, nitrogen or argon. The reaction occurs without substantial evolution of heat and proceeds rapidly at atmospheric temperature. Generally, the reaction temperature will be within the range from —70 to 100° C.

In the second stage of the reaction a suitable hydrocarbon halide, generally one containing not more than eight carbon atoms, is added to the primary reaction product. Preferably the proportion of halide is about one mole per mole of decaborane initially used but this can vary from about 0.5 to 5 moles of halide. Not over one mole of halide per mole of metal alkyl is preferably used and this can be as low as 0.5 mole or less. Larger proportions of halide can be used and the proportion can be as high as five or more moles of halide per mole of metal alkyl. No significant improvement in yield appears to result from the use of these larger proportions but the yield may be reduced by the use of proportions much lower than 1:1.

The halide is suitably added in solution in an inert solvent which can be the same or different from that used in the initial stage of the reaction provided it is non-reactive with metal alkyls. The addition can be carried out at any temperature between —70 and 100° C. but preferably at about —10 to 30° C. The inert gaseous atmosphere used in the first stage is preferably continued in the second stage. Advantageously the reaction mixture is refluxed after the hydrocarbon halide has been added in order to improve the yield. A short reaction time of one hour or less appears to be sufficient but the yield is somewhat improved by longer periods of reflux, for example, up to 18 hours or more.

After completion of the reaction the product in solution in the organic solvent is removed from the inorganic salts (metal halide), for example, by filtration or decantation. The latter are extracted with additional quantities of solvent and the extracts are combined with the original organic solution. The desired product is recovered by distillation of the extract. Suitably the product is vacuum distilled.

Suitable metal alkyls, generally alkali metal alkyls and containing not more than five carbon atoms, are prepared in known manner from the alkyl halide and metal, for example, sodium or lithium in anhydrous ether or by any other suitable method. Examples of suitable metal alkyls include methyl lithium, ethyl lithium, n-butyl sodium, diethyl magnesium and methyl magnesium bromide. Thus by the term metal alkyls, we mean to include the dialkyl magnesium compounds and the Grignard reagents as well as the alkali metal alkyls.

Hydrocarbon halides which can be used, include the monohaloalkanes such as ethyl bromide or chloride, isopropyl bromide or chloride, n-butyl bromide or chloride and the like. The halide can also be unsaturated, for example, allyl bromide or chloride or propargyl bromide or chloride. In addition, aromatic substituted alkyl halides can be used, for example, benzyl chloride or bromide.

The process of the present invention is carried out in a suitable solvent which does not react wtih metal alkyls or boron hydrides. Aliphatic hydrocarbons, for example, n-pentane, iso-octane and 2,2,4-trimethylpentane, can be used. Ethers, sufficiently stable to metal alkyls, including diethyl ether, dimethyl ether, methyl ethyl ether and tetrahydrofurane, are suitable. Alicyclic and aromatic hydrocarbons are also useful, including benzene, cyclohexane and methylcyclopentane, for example.

In the alternate procedure suitable for use according to the present invention, the three reactants can be combined by dissolving decaborane and the alkyl halide in a suitable non-reactive solvent and adding the metal alkyl in the same or a different suitable solvent to the mixture. The alkylated decaborane product is recovered from the reaction mixture as described above. However, poorer yields are obtained when the operation is carried out in one stage.

The process of the present invention has the advantage that substantially atmospheric pressures and substanstantially atmospheric temperatures can be used and no dangerous pressures formed provided the by-product gases are suitably vented from the reaction vessel.

*Example I*

In a 1-liter, three-necked flask equipped with a Dry-Ice cold finger, true-bore mechanical stirrer, thermometer and dropping funnel, all under a head of pure, dry argon, was placed 30.5 g. (0.250 mole) of decaborane dissolved in 300 ml. of ether together with 27.4 g. (0.250 mole) of ethyl bromide. While the reaction mixture was stirred at —10° or below, 0.249 mole of ethyl lithium in 185 ml. of ether was added over a period of one hour. After the addition of the metal alkyl the solution was allowed to come to room temperature and then brought to reflux temperature for four hours. The ether was then removed in vacuo and 800 ml. of benzene was added. The mixture was heated at reflux temperature for one hour and then decanted free from the white solid. The benzene was then removed by distillation and the residue was vacuum distilled to obtain the liquid ethyl decaborane product boiling at 90 to 110° C. at 3.5 mm.

*Example II*

The procedure and apparatus used in this reaction was essentially that of Example I. A solution containing 58.6 g. (0.480 mole) of decaborane in 450 ml. of dry ether was treated with 0.480 mole of ethyl lithium in 250 ml. of ether added during 1.5 hours at a temperature of −5 to −10°. After the addition, the mixture was stirred under reflux for twenty minutes. Propargyl bromide, 57.1 g. (0.480 mole), in 150 ml. of dry ether was added with stirring during one-half hour at 0° C., and the mixture was then heated under reflux for 24 hours. The ether was replaced by the addition of benzene while the ether was removed by distillation. The benzene solution was decanted from the precipitated salts. Distillation of the benzene left a high boiling oil which distilled at 61–81° C. at 0.1 to 0.5 mm. pressure. The distillate of hydrocarbon-substituted decaborane weighed 22.8 g.

*Example III*

In apparatus similar to that used in Example I, 67.6 g. (0.555 mole) of decaborane dissolved in 450 ml. of dry ether was treated with an equimolar quantity of ethyl lithium in 295 ml. of ether at 0 to −10° C. After stirring under reflux for 15 minutes after the ethyl lithium solution was added, a solution of 67.2 g. (0.555 mole) of allyl bromide in 100 ml. of ether was added during a period of 0.5 hour at a temperature of from 0 to −10° C. The mixture was then stirred under reflux for 15 hours. The ether solution was decanted and the residue extracted first with hot isooctane and then benzene. The extracts were distilled separately and the crude high boiling materials from each were combined. Redistillation gave 14.7 g. of liquid, hydrocarbon-substituted decaborane (mostly ethyldecaborane) having a boiling range of 76 to 86° C. at 0.3 to 0.5 mm.

*Example IV*

A solution containing 41.4 g. (0.338 mole) of decaborane and 300 ml. of dry ether was placed in a 250 ml., three-necked flask equipped with a magnetic stirrer, Dry-Ice condenser and dropping funnel all under a head of argon gas. From the dropping funnel there was added 0.338 mole of ethyl lithium in 260 ml. of dry ether. The entire addition took 45 minutes. The temperature was held at −20° to −25° C. during the addition and was maintained at this level for one-half hour after the addition was complete. The well-stirred solution was then treated with 58.0 g. (0.338 mole) of benzyl bromide in 150 ml. of ether at −25° C. during a period of one-half hour. The temperature was allowed to rise slowly and the mixture was heated under reflux for 15 hours. After decantation of the ether solution the inorganic residue was extracted with 650 ml. of benzene. The solvents were removed by distillation and the residue was vacuum distilled. The resulting liquid alkyl decaborane (mostly ethyldecaborane) boiled at 65 to 150° C. at 0.3 mm. and weighed 7.3 g.

The compositions produced in accordance with our invention can be employed as fuels when burned with air. Thus, they can be used as fuels in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The compositions produced in accordance with our invention are particularly suited for use as a fuel in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varies from a maximum at static sea level conditions to a minimum at the absolute ceiling of the aircraft, which may be 65,000 feet or 70,000 feet or higher. The compression ratios of the current and near-future aircraft gas turbines are generally within the range from 5:1 to 15:1 or 20:1, the compression ratio being the absolute pressure of the air after having been compressed (by the compressor in the case of the turbojet or turboprop engine) divided by the absolute pressure of the air before compression. Therefore, the operating combustion pressure in the combustor can vary from approximately 90 to 300 pounds per square inch absolute at static sea level conditions to about 5 to 15 pounds per square inch absolute at the extremely high altitudes of approximately 70,000 feet. The products of our invention are well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.020 across a combustion system when the fuel employed is a simple hydrocarbon, rather than a borohydrocarbon produced in accordance with the present invention. Excess air is introduced into the combustor for dilution purposes so that the resultant gas temperature at the turbine wheel in the case of the turbojet or turboprop engine is maintained at the tolerable limit. In the zone of the combustor where the fuel is injected the local fuel-air ratio is approximately stoichiometric. This stoichiometric fuel to air ratio exists only momentarily, since additional air is introduced along the combustor and results in the overall ratio of approximately 0.012 to 0.020 for hydrocarbons before entrance into the turbine section. For the higher energy fuels produced in accordance with the present invention, the local fuel to air ratio in the zone of fuel injection should also be approximately stoichiometric, assuming that the boron, carbon and hydrogen present in the products burn to boric oxide, carbon dioxide and water vapor. In the case of the ethyldecaborane containing about 72 percent by weight of boron, for example, this local fuel to air ratio by weight is approximately 0.072. For the higher energy fuels produced in accordance with the present invention, because of their higher heating values in comparison with the simple hydrocarbons, the overall fuel-air ratio by weight across the combustor will be approximately 0.008 to 0.016 if the resultant gas temperature is to remain within the presently established tolerable temperature limits. Thus, when used as the fuel supplied to the combustor of an aircraft gas turbine engine, the products produced in accordance with the present invention are employed in essentially the same manner as the simple hydrocarbon fuel presently being used. The fuel is injected into the combustor in such manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combustion before they enter the turbine so that they do not damage the turbine. Present-day turbine blade materials limit the turbine inlet temperature to approximately 1600–1650° F. Operations at these peak temperatures is limited to periods of approximately five minutes at take-off and climb and approximately 15 minutes at combat conditions in the case of military aircraft. By not permitting operation at higher temperatures and by limiting the time of operation at peak temperatures, satisfactory engine life is assured. Under normal cruising conditions for the aircraft, the combustion products are sufficiently diluted with air so that a temperature of approximately 1400° F. is maintained at the turbine inlet.

The products produced in accordance with our invention can also be employed as aircraft gas turbine fuels in admixture with the hydrocarbons presently being used, such as JP-4. When such mixtures are used, the fuel-air ratio in the zone of the combustor where combustion is initiated and the overall fuel-air ratio across the combustor will be proportional to the relative amounts of borohydrocarbon and hydrocarbon fuel present in the mixture, and consistent with the air dilution required to maintain the gas temperatures of these mixtures within accepted turbine operating temperatures.

Because of their high chemical reactivity and heating values, the products produced in accordance with our invention can be employed as fuels in ramjet engines and in afterburning and other auxiliary burning schemes for the turbojet and bypass or ducted type engines. The operating conditions of afterburning or auxiliary burning schemes are usually more critical at high altitudes than those of the main gas turbine combustion system because of the reduced pressure of the combustion gases. In all cases the pressure is only slightly in excess of ambient pressure and efficient and stable combustion under such conditions is normally difficult with simple hydrocarbons. Extinction of the combustion process in the afterburner may also occur under these conditions of extreme conditions of altitude operations with conventional aircraft fuels.

The burning characteristics of the products produced in accordance with our invention are such that good combustion performance can be attained even at the marginal operating conditions encountered at high altitudes, insuring efficient and stable combustion in the zone of operation before lean and rich extinction of the combustion process is encountered. Significant improvements in the non-afterburning performance of a gas turbine-afterburner combination is also possible because the high chemical reactivity of the products produced in accordance with our invention eliminates the need of flameholding devices within the combustion zone of the afterburner. When employed in an afterburner, the fuels produced in accordance with our invention are simply substituted for the hydrocarbon fuels which have been heretofore used and no changes in the manner of operating the afterburner need be made.

The ramjet is also subject to marginal operating conditions which are similar to those encountered by the afterburner. These usually occur at reduced flight speeds and extremely high altitudes. The products produced in accordance with our invention will improve the combustion process of the ramjet in much the same manner as that described for the afterburner because of their improved chemical reactivity over that of simple hydrocarbon fuels. When employed in a ramjet the fuels produced in accordance with our invention will be simply substituted for hydrocarbon fuels and used in the established manner.

We claim:

1. A method for the preparation of liquid, hydrocarbon derivatives of decaborane which comprises reacting decaborane, a metal alkyl selected from the group consisting of alkali metal alkyls containing from 1 to 5 carbon atoms, magnesium dialkyls containing not more than 5 carbon atoms and alkyl magnesium halides containing from 1 to 5 carbon atoms and a hydrocarbon halide selected from the group consisting of alkyl, alkene, alkine and phenyl substituted alkyl monohalides in which the hydrocarbon portion of said halides contains not more than 8 carbon atoms in solution in an organic solvent which is inert under the reaction conditions to produce a hydrocarbon derivative of the decaborane, an alkane and a metal halide.

2. The method of claim 1 wherein the metal alkyl is an alkali metal alkyl containing from 1 to 5 carbon atoms, wherein the hydrocarbon halide is an alkyl halide containing from 1 to 8 carbon atoms, wherein from 0.5 to 3 moles of metal alkyl per mole of decaborane and from 0.5 to 5 moles of hydrocarbon halide per mole of decaborane are used, wherein said solvent is a lower dialkyl ether and wherein the reaction is conducted at a temperature within the range from −70 to 100° C.

3. The method of claim 2 wherein the metal alkyl is ethyl lithium, wherein the hydrocarbon halide is ethyl bromide and wherein the solvent is diethyl ether.

4. The method for the preparation of liquid, hydrocarbon derivatives of decaborane which comprises reacting decaborane and a metal alkyl selected from the group consisting of alkali metal alkyls containing from 1 to 5 carbon atoms, magnesium dialkyls containing not more than 5 carbon atoms and alkyl magnesium halides containing from 1 to 5 carbon atoms in solution in an organic solvent which is inert under the reaction conditions to produce an alkane and a metal-decaborane reaction product, and reacting said reaction product with a hydrocarbon halide selected from the group consisting af alkyl, alkene, alkine and phenyl subsitiuted alkyl monohalides in which the hydrocarbon portion of said halides contains not more than 8 carbon atoms in solution in an organic solvent which is inert under the reaction conditions to produce a hydrocarbon derivative of the decaborane and a metal halide.

5. The method of claim 4 wherein the metal alkyl is an alkali metal alkyl containing from 1 to 5 carbon atoms.

6. The method of claim 4 wherein the hydrocarbon halide is an alkyl halide containing from 1 to 8 carbon atoms.

7. The method of claim 4 wherein from 0.5 to 3 moles of metal alkyl per mole of decaborane and from 0.5 to 5 moles of hydrocarbon halide per mole of decaborane are used.

8. The method of claim 4 wherein each reaction is conducted at a temperature within the range from −70 to 100° C.

9. The method of claim 4 wherein the metal alkyl is an alkali metal alkyl containing from 1 to 5 carbon atoms, wherein the hydrocarbon halide is an alkyl halide containing from 1 to 8 carbon atoms, wherein from 0.5 to 3 moles of metal alkyl per mole of decaborane and from 0.5 to 5 moles of hydrocarbon halide per mole of decaborane are used, wherein the solvent in each case is a lower dialkyl ether and wherein each reaction is conducted at a temperature within the range from −70 to 100° C.

10. The method of claim 9 wherein the metal alkyl is ethyl lithium, wherein the hydrocarbon halide is ethyl bromide and wherein the solvent is diethyl ether.

No references cited.